(12) United States Patent
Zhu

(10) Patent No.: US 10,172,199 B1
(45) Date of Patent: Jan. 1, 2019

(54) LIGHT-ACTUATED WIDE VOLTAGE RANGE LED LAMP DRIVER CIRCUIT

(71) Applicant: Jianrong Zhu, Taizhou (CN)

(72) Inventor: Jianrong Zhu, Taizhou (CN)

(73) Assignee: Taizhou JiaoGuang Lighting Co., Ltd., Taizhou (CN)

( * ) Notice: Subject to any disclaimer, the term of this patent is extended or adjusted under 35 U.S.C. 154(b) by 0 days.

(21) Appl. No.: 15/946,019

(22) Filed: Apr. 5, 2018

(30) Foreign Application Priority Data

Jun. 30, 2017 (CN) .......................... 2017 1 0524616

(51) Int. Cl.
*H05B 33/08* (2006.01)
(52) U.S. Cl.
CPC ..... *H05B 33/0815* (2013.01); *H05B 33/0824* (2013.01); *H05B 33/0854* (2013.01)
(58) Field of Classification Search
CPC ................ H05B 33/08; H05B 33/0812; H05B 33/0815; H05B 33/0824; H05B 33/0842; H05B 33/0854; H05B 33/0881; H05B 37/02
USPC .... 315/151, 152, 209 R, 224–226, 291, 294, 315/307, 308
See application file for complete search history.

(56) References Cited

U.S. PATENT DOCUMENTS

2011/0062888 A1*  3/2011  Bondy ............... H05B 33/0815
                                                       315/294
2018/0007758 A1*  1/2018  Rucker ............. H05B 33/0851

FOREIGN PATENT DOCUMENTS

CN          103929866 A      7/2014
CN          205657879 U     10/2016

* cited by examiner

*Primary Examiner* — Jimmy Vu
(74) *Attorney, Agent, or Firm* — Minder Law Group; Willy H. Wong

(57) ABSTRACT

The present light-actuated wide voltage range LED lamp driver circuit includes a rectifier module, two LED modules, a detection module, a control module, a light actuated module, an actuator and a main relay. The output terminals of the rectifier module are connected to the detection module and the control module respectively, and the detection module and the two LED modules are respectively connected to the control module. The detection module includes a transistor Q1 and a transistor Q2. In the low voltage range, both of the transistor Q1 and the transistor Q2 are turned off, making the two LED lamp modules connected in parallel; while In the high voltage range, both of the transistor Q1 and the transistor Q2 are turned on, making the two LED lamp modules connected in series.

10 Claims, 6 Drawing Sheets

LIGHT-ACTUATED WIDE VOLTAGE RANGE LED LAMP DRIVER CIRCUIT

RELATED APPLICATIONS

This application claims priority to China Patent Application No. CN201710524616.2, filed Jun. 30, 2017.

The applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention pertains to the technical field of driver circuit, and more particularly to a light-actuated wide voltage range LED lamp driver circuit.

Related Art

LED is short for light-emitting diode, and it is a semiconductor component. At first, it was used as indicator light, LED board and etc. With the appearance of white LEDs, LED is often used as lighting. LED lamps are known as the fourth generation of lighting source and green lighting source, possessing advantages such as energy saving, environmentally friendly, long lifetime, and small size. Since LED lamps possess the above advantages, they are popular among users in the world.

As the working voltage of LED lamps is generally a DC (direct current) voltage, a driver circuit is required to be set inside LED lamps to convert the mains voltage into a DC voltage. Later, the working voltage of LED lamps is obtained after a voltage division, in order to turn on the LED lamps. Because the mains voltage in many countries and regions is not uniform; for example, mains voltage in China is 220V, and in Japan is 110V, same driver circuits of LED lamps cannot be used in countries with different mains. Only by changing the driver circuit, or by buying a matched transformer as a change-over, can the LED lamps be used. This is very inconvenient for manufacturers and users.

For this reason, one prior art discloses a high-voltage LED drive circuit capable of operating under full voltage. The circuit includes at least LED units, and each group LED unit includes a plurality of high voltage LEDs, a plurality of switch transistor and an additional set of LED module a line voltage detection unit, which supplies a series-parallel control signal based on the power supply voltage, a series-parallel switch control unit for controlling the series-parallel connection among groups of the LED units based on the series-parallel control signal, a rectifying output unit for converting the connected power supply into the voltage required by the LED unit, a driver unit for controlling the on-off state of each switch tube in each group of LED unit and the current of each high voltage LED based on the output voltage of the rectifying output circuit. Hence, it allows LED lamps to be driven by either a low voltage of 120V and or a high voltage of 277V.

Although the above patent can achieve the operation of LED lamps under a low mains voltage of 120V and a high mains voltage of 277V, the scope of application is still small, and it is not able for the LED lamps to operate under the mains in any region. At the same time, the above patent does not automatically turn on the LED lamp under low ambient light conditions. It has a low intelligence.

SUMMARY OF THE INVENTION

In view of the issued stated above in the prior art, one embodiment of the present invention provides a light-actuated wide voltage range LED lamp driver circuit. The technical problem to be solved by one embodiment of the present invention is how to make the LED lamp suitable for a wide range of mains voltage.

One embodiment of the present invention is realized by the following technical solutions:

A light-actuated wide voltage range LED lamp driver circuit includes a rectifier module connected to the mains and two LED modules. It is characterized in that:

The driver circuit further includes a detection module for detecting whether the input voltage is in a low voltage range or in a high voltage range, and a control module for switching two LED modules into a series or a parallel connection and controlling the two LED modules to work at the rated power. The output terminals of the rectifier module are connected to the detection module and the control module respectively. The detection module and the two LED modules are respectively connected to the control module. The control module is provided with the set value of the voltage for switching the two LED sets into series connection, and the detection module includes a transistor Q1 and a transistor Q2. The control module outputs a reference voltage to the transistor Q1 and the transistor Q2. The rectifier module outputs a detection voltage to the transistor Q1 and the transistor Q2. In the low voltage range, both of the transistor Q1 and the transistor Q2 are turned off, making the two LED modules connected in parallel; while in the high voltage range, both of the transistor Q1 and the transistor Q2 are turned on, making the two LED modules connected in series.

By providing the detection module, one embodiment of the present light-actuated wide voltage range LED lamp driver circuit can output different voltage signals to the control module according to different input voltage ranges. The control module can control the two LED lamps to be connected in series or in parallel to maximize the utilization of the current input voltage. At the same time, this ensures that the two LED lamps work at rated power, so that the driver circuit can adapt to a wide range of mains voltage. By setting the driver circuit, LED lamp products can be "plug and play" in most countries. The mains is rectified through the rectifier module. After the rectification, it is sent to the detection module and the control module. The detection module is provided with a transistor Q1 and a transistor Q2. When the output voltage of the rectifier module is in the low voltage range, the voltage does not meet the conduction conditions of the transistor Q1 and the transistor Q2, and the two MOS transistor are turned off. Hence, the voltage signal output by the detection module to the control module is lower than the set value. In this case, the control module makes the two groups of LED modules connected in parallel, so that a low voltage can also ensure the voltage input to the LED lamps is enough to work. When the transistor Q1 and the transistor Q2 are both turned on, the detection module outputs a voltage signal higher than the set value to the control module. The control module controls two LED modules to connect in series, because at this moment, the high voltage input is enough for the LED modules to work in series connection. After completing the series or parallel connection, the control module also regulates the power of the LED module, making the LED module work at the rated power.

In one embodiment of the light-actuated wide voltage range LED lamp driver circuit described above, the detection module further includes a resistor R1, a resistor R2, a resistor R3, a resistor R4, a resistor R5, and a first resistor unit having at least one resistor, in order to divide the voltage. One end of the first resistor unit is connected to the output terminal of the rectifier module. The collector of the transistor Q1 is connected to the control module and is connected to the other end of the first resistor unit through the resistor R1. The emitter of transistor Q1 is connected to the control module, and the base of transistor Q1 is connected to the control module through resistor R2. The collector of the transistor Q2 is connected to the base of the transistor Q1 through resistor R3, and the emitter of the transistor Q2 is connected to the control module through resistor R4, and the base of the transistor Q2 is connected to the other end of the first resistor unit. The base of the transistor Q2 is also connected to one end of the resistor R5, and the other end of resistor R5 is grounded. The emitter of the transistor Q2 is further connected with resistor R6, and the other end of resistor R6 is grounded.

The first resistor unit includes a resistor R7 and a resistor R8 connected in series. All of the resistor R1, resistor R2, the resistor R3, the resistor R4, resistor R5, resistor R7 and resistor R8 play a role in voltage dividing. When the input voltage is in the low voltage range, the conduction conditions of transistor Q1 and transistor Q2 is not met, and thus transistor Q1 and the transistor Q2 are turned off. After the voltage output by the rectifier module is divided by resistor R7, resistor R8 and resistor R1, it becomes a voltage signal lower than the set value of the voltage, and then is sent to the control module, transistor Q1 is a PNP type MOS transistor, and transistor Q2 is an NPN type transistor.

In one embodiment of the light-actuated wide voltage range LED lamp driver circuit described above, the detection module further includes a transistor Q3, a resistor R9 and a second resistor unit. The base of transistor Q3 is connected to one end of the second resistor unit and one end of resistor R9, and the other end of the second resistor unit is connected to the output terminal of the rectifier module. The other end of resistor R9 is grounded. The emitter of transistor Q3 is connected to the emitter of transistor Q2, and the collector of the transistor Q3 is connected to the collector of the transistor Q2. The total resistance of the second resistor unit is higher than the total resistance of the first resistor unit. The second resistor unit includes the resistor R10. By setting the transistor Q3, the high voltage detection range can increase, and the scope of application of the driver circuit is improved. Since the total resistance of the second resistor unit is higher than the total resistance of the first resistor unit, and since the connection point of transistor Q3 is the same as the connection point of transistor Q2. Therefore, when the conduction conditions of transistor Q2 are met, the conduction conditions of transistor Q3 may not be met yet. Transistor Q3 is not turned on, until the voltage output by the rectifier module is higher than a certain value, and MOS transistor Q4 is also turned on at this point. When the voltage continues to increase, MOS transistor Q4 is turned off, but transistor Q3 remains on, until it is beyond the high voltage range. Transistor Q3 is a NPN type MOS transistor.

In one embodiment of the light-actuated wide voltage range LED lamp driver circuit described above, the control module includes a MOS transistor Q4, a MOS transistor Q5, and resistor R13. In the low voltage range, the detection module outputs a voltage signal lower than the voltage set value to MOS transistor Q4, switching MOS transistor Q4 off and MOS transistor Q5 on. In the high voltage range, the detection module outputs a voltage signal higher than the voltage set value to MOS transistor Q4, switching MOS transistor Q4 on and MOS transistor Q5 off. The drain of MOS transistor Q4 is connected to the gate of MOS transistor Q5, and the source of MOS transistor Q4 is connected with resistor R11. The other end of resistor R11 is grounded. The gate of MOS transistor Q4 is respectively connected with resistor R1 and the collector of transistor Q1, and the gate of the MOS transistor Q4 is further connected with a resistor R12. The other end of resistor R12 is grounded. The drain of the MOS transistor Q5 is connected to the output terminal of the rectifier module, and the source of MOS transistor Q5 is connected with a diode D1. The anode of diode D1 is connected to the MOS transistor Q5, and the cathode is connected to the input terminal of one of the two LED modules. The input terminal of the other LED module is connected to the output terminal of the rectifier module through resistor R13 and the output terminal of that LED module is connected to the cathode of diode D1. The gate of MOS transistor Q5 is connected with the third resistor unit, and the third resistor unit is connected to the output terminal of the rectifier module.

The gate of MOS transistor Q4 receives the voltage signal sent by the detection module. In the low voltage range, the conduction conditions of MOS transistor Q4 is not met. At this point, MOS transistor Q4 is turned off, and the current flows from the third resistor unit to the gate of MOS transistor Q5. MOS transistor Q5 has a higher voltage to meet the conduction conditions. At this point, the current flows one way through MOS transistor to one of the two groups of LED lamps, and flows the other way through resistor R13 to the other group of LED lamps, realizing the two groups of LED lamps being connected in parallel. In the high voltage range, the conduction conditions of MOS transistor Q4 is met. At this point, MOS transistor Q4 is turned on, and MOS transistor Q5 is turned off. At this point, there is only one way for the current to flow, and thus the two LED modules are connected in series. The third resistor unit includes a resistor R14, a resistor R15 and a resistor R16. The voltage set value is the minimum value where MOS transistor Q4 conducts.

In one embodiment of the light-actuated wide voltage range LED lamp driver circuit described above, the control module includes a control chip for adjusting the operating power of the LED module. The detection input terminal of the control chip is connected with a sampler. The control output terminal of the control chip is connected with a power regulator. The output terminals of the two LED modules are respectively connected to the input terminals of the power regulator. The output terminal of the power regulator is connected to the sampler. The power supply terminal of the control chip is connected with a resistor R17. The resistor R17 is connected to the output terminal of the rectifier module. The power output terminals of the control chip are respectively connected to the emitter of transistor Q1, the emitter of transistor Q2 and the emitter of transistor Q3. The control chip makes decision according to the voltage signal sent by the sampler, and controls the power regulator to adjust the operating power of the LED module. The control chip outputs a reference voltage to the emitter of transistor Q1, the emitter of transistor Q2 and the emitter of the transistor Q3, used by transistor Q1, transistor Q2 and transistor Q3 to detect the input voltage of the rectifier module. At the same time, the control chip ensures the LED module working at the rated power, no matter in serial or parallel connection, by controlling the power regulator.

In one embodiment of the light-actuated wide voltage range LED lamp driver circuit described above, the sampler includes a resistor R18, a resistor R19, a resistor R20, a MOS transistor Q6 and a MOS transistor Q7. In the low voltage range, MOS transistor Q6 is turned off, and MOS transistor Q7 is turned on to connect the resistor R18 and the resistor R20 in series. The detection input terminal of the control chip samples the voltage on resistor R18. In the high voltage range, MOS transistor Q6 is turned on, MOS transistor Q7 is turned off, and the detection input terminal of the control chip samples the voltage on resistor R19. Since the different connection modes of the two LED modules in the low voltage range and in the high voltage range, in order to ensure the two LED modules work at the rated power in the two different connection modes, it is needed to increase the LED module 3 working current when connected in parallel. Through the above arrangement, at a low voltage, the control chip can adjust through the power regulator the working current of the LED module to be higher than the working current of the LED module at a high voltage. Hence, the operating power of the LED module can be the same in the low voltage range and the high voltage range.

In one embodiment of the light-actuated wide voltage range LED lamp driver circuit described above, the sampler further includes a MOS transistor Q8. One end of resistor R18 is respectively connected to the detection input terminal of the control chip and one end of resistor R20; And the other end of resistor R18 is respectively connected to one end of resistor R19 and the power regulator. The other end of resistor R19 is grounded. The other end of resistor R20 is connected to the drain of the MOS transistor Q7, and the source of MOS transistor Q7 is grounded. The gate of MOS transistor Q7 is connected to the power output terminal of the control chip.

A resistor R21 and a resistor R22 are connected between the gate of MOS transistor module Q7 and the power output terminal. The drain of MOS transistor Q6 is connected to the power output terminal of the control chip through resistor R22. The gate of MOS transistor Q6 is connected to the gate of MOS transistor Q4, and the gate of MOS transistor Q8 is connected to the gate of MOS transistor Q7. The drain of MOS transistor Q8 is connected to power regulator, and the source of MOS transistor Q8 and the source of MOS transistor Q6 are grounded. The above arrangement of the sampler allows MOS transistor Q6 to be turned off in the low voltage range, MOS transistor Q7 to be turned on, and MOS transistor Q8 to be turned on. The MOS transistor Q8 is turned on so that the power regulator performs power adjustment on the two LED modules connected in parallel. In the high voltage range, Q6 is turned on, MOS transistor Q7 is turned off and MOS transistor Q8 is turned off. MOS transistor Q8 is turned off so that power regulator performs power adjustment on the two LED modules connected in series.

In one embodiment of the light-actuated wide voltage range LED lamp driver circuit described above, the power regulator includes two sets of MOS transistors, and each set of MOS transistors at least includes one MOS transistor. Each LED module includes at least one LED unit, and one LED unit includes at least one LED lamp. The output terminals of the two LED modules are both connected to one set of the MOS transistors, and the other set of MOS transistors is connected to one set of the LED modules. By adjusting the duty cycle of MOS transistors, the working current of the LED module is adjusted. Hence, the operating power of the LED module in low voltage range and high voltage range is the same.

In one embodiment of the light-actuated wide voltage range LED lamp driver circuit described above, each LED module has three LED units, named first LED unit, second LED unit, third LED unit, fourth LED unit, fifth LED unit, and sixth LED unit respectively. Each LED unit would be a single LED, or be multiple LEDs in series or/and parallel.

Three LED units from each set are connected in series consecutively. One group of MOS transistors has three MOS transistors, named MOS transistor Q9, MOS transistor Q10, and MOS transistor Q11 respectively. The other group of MOS transistors has two MOS transistors, named MOS transistor Q12 and MOS transistor Q13 respectively. The drain of MOS transistor Q9 is connected to the current output terminals of the first LED unit and the fourth LED unit respectively. The drain of MOS transistor Q10 is connected to the current output terminals of the second LED unit and the fifth LED unit respectively, and the drain of MOS transistor Q11 is respectively connected with the current output terminals of the third LED unit and the sixth LED unit. The drain of MOS transistor Q12 is connected to the current output terminal of the fifth LED unit, and the drain of MOS transistor Q13 is connected to the current output terminal of the sixth LED unit. The gate of MOS transistor Q9, the gate of MOS transistor Q10, the gate of MOS transistor Q11, the gate of MOS transistor Q12 and the gate of MOS transistor Q13 are respectively connected to the control output terminals of the control chip. The source of MOS transistor Q9, the source of MOS transistor Q10, the source of MOS transistor Q11, the source of MOS transistor Q12, and the source of MOS transistor Q13 are respectively connected to resistor R19.

The working voltage of the first LED unit is the same as the working voltage of the fourth LED unit, the working voltage of the second LED unit is the same as the working voltage of the fifth LED unit, and the working voltage of the third LED unit is the same as the working voltage of the sixth LED unit. By setting a plurality of MOS transistors to adjust the working current of the corresponding LED unit respectively, the regulation efficiency is high. In addition, setting multiple MOS transistors allows a good heat dissipation effect, and improves the stability of the circuit.

In one embodiment of the light-actuated wide voltage range LED lamp driver circuit described above, the driver circuit further includes a light actuated module with a light sensor. The light actuated module can switch on and off the mains and the rectifier module, according to the brightness of the ambient light. Through the arrangement stated above, the driver circuit also has a light control function. When the ambient light is low, the light actuated module controls the circuit between the mains and the rectifier module to conduct. When the ambient light is high, the light actuated module controls the circuit between the mains and the rectifier module to disconnect.

In one embodiment of the light-actuated wide voltage range LED lamp driver circuit described above, the light actuated module includes an actuator and a main relay. The light sensor is connected to the input terminal of the actuator, and the main relay is used to be connected between the mains and the rectifier module. The main relay is connected to the output terminal of the actuator, and the light sensor is a photoresistor. The coil of the main relay is connected to the output terminal of the actuator, and the normally-open switch of the main relay is used to connect between the mains and the rectifier module. The photoresistor has different resistance according to different brightness of the ambient light so that the signal input to the actuator is different. The actuator controls the normally-open switch of the main relay to be closed when the input signal is lower than the set value of the light brightness set in the actuator. Hence, the rectifier module is powered on. The present driver circuit also has a power supply for supplying the actuator with power.

Compared to the prior art, one embodiment of the present light-actuated wide voltage range LED lamp driver circuit has the following advantages:

1. The present invention can output different voltage signals to the control module according to different input voltage ranges by providing the detection module. The control module can control two groups of LED lamps connected in series or in parallel to maximize the utilization of the current input voltage and the applicable scope is wider.

2. The present invention can keep the LED module working at the rated power under either low voltage input or high voltage input.

3. The present invention can detect ambient light, and thus automatically switches on and off, being suitable to be used as street lights in different countries.

DETAILED DESCRIPTION OF THE INVENTION

The embodiments of this invention will be described below and the technical solutions of the invention will be further illustrated in connection with the accompanying figures. However, the present invention shall not be limited to these embodiments.

Figure 2:
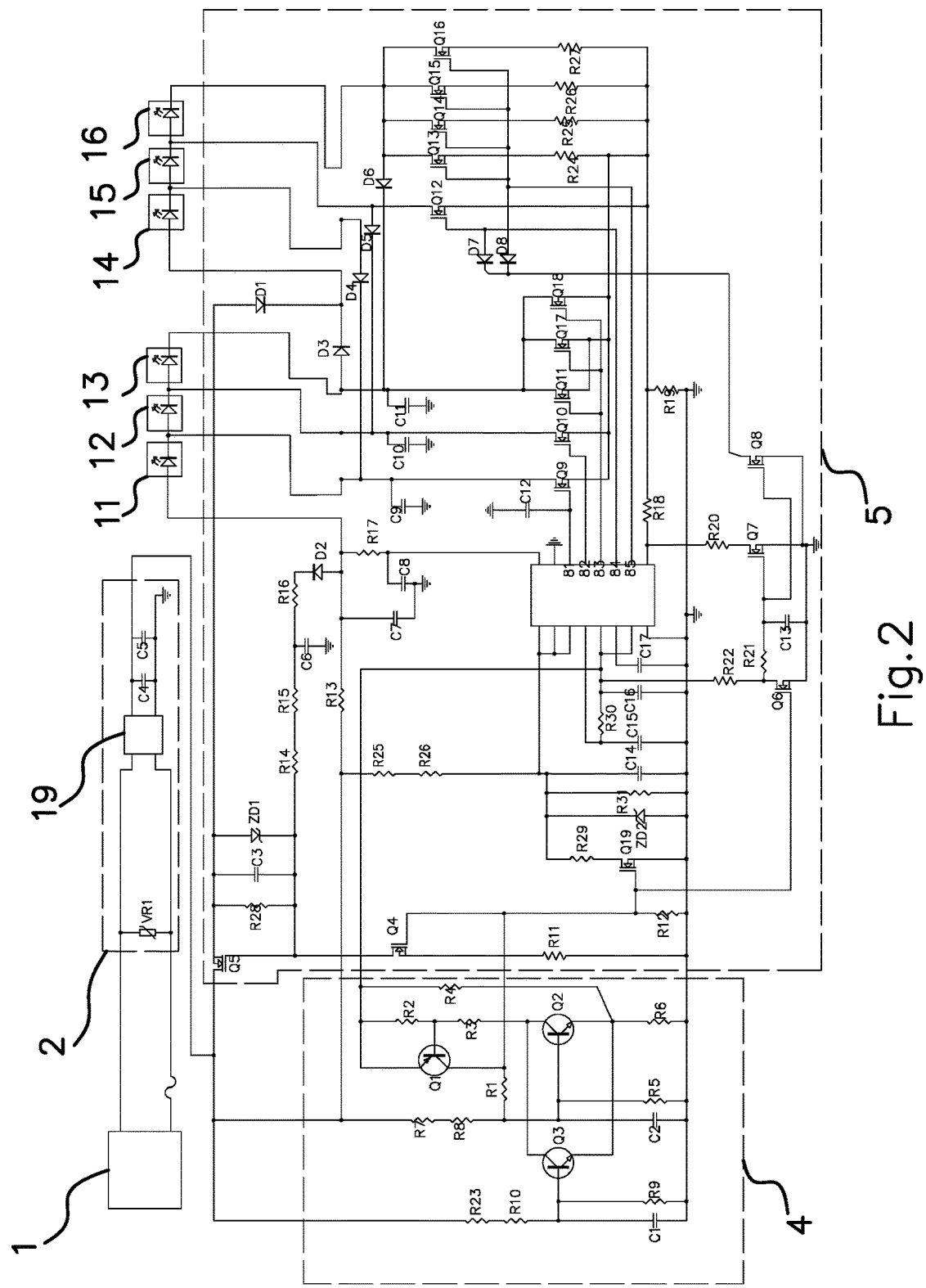
FIG. 2 is a schematic diagram of a wide voltage range driver circuit of one embodiment of the present invention.
Figure 3:
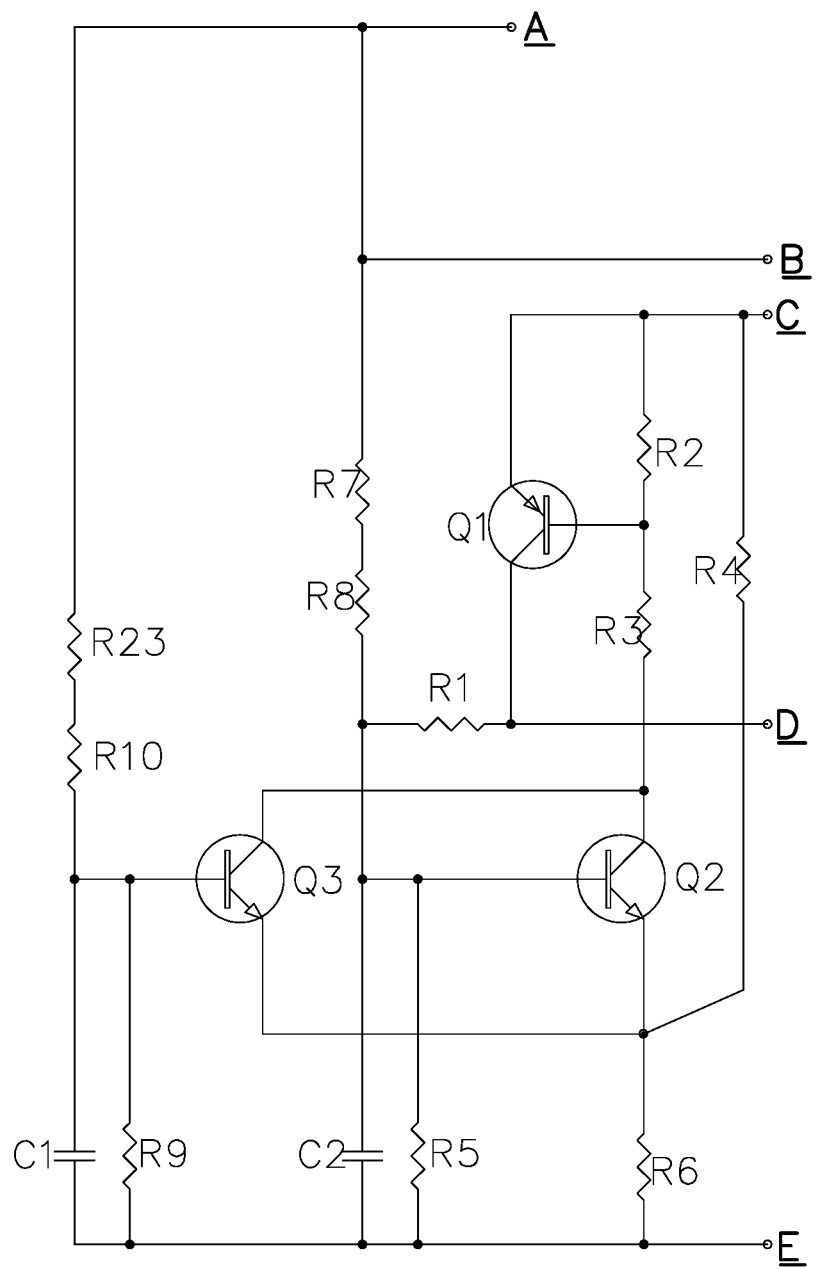
FIG. 3 is a schematic view of a detection module of one embodiment of the present invention.
Figure 4:
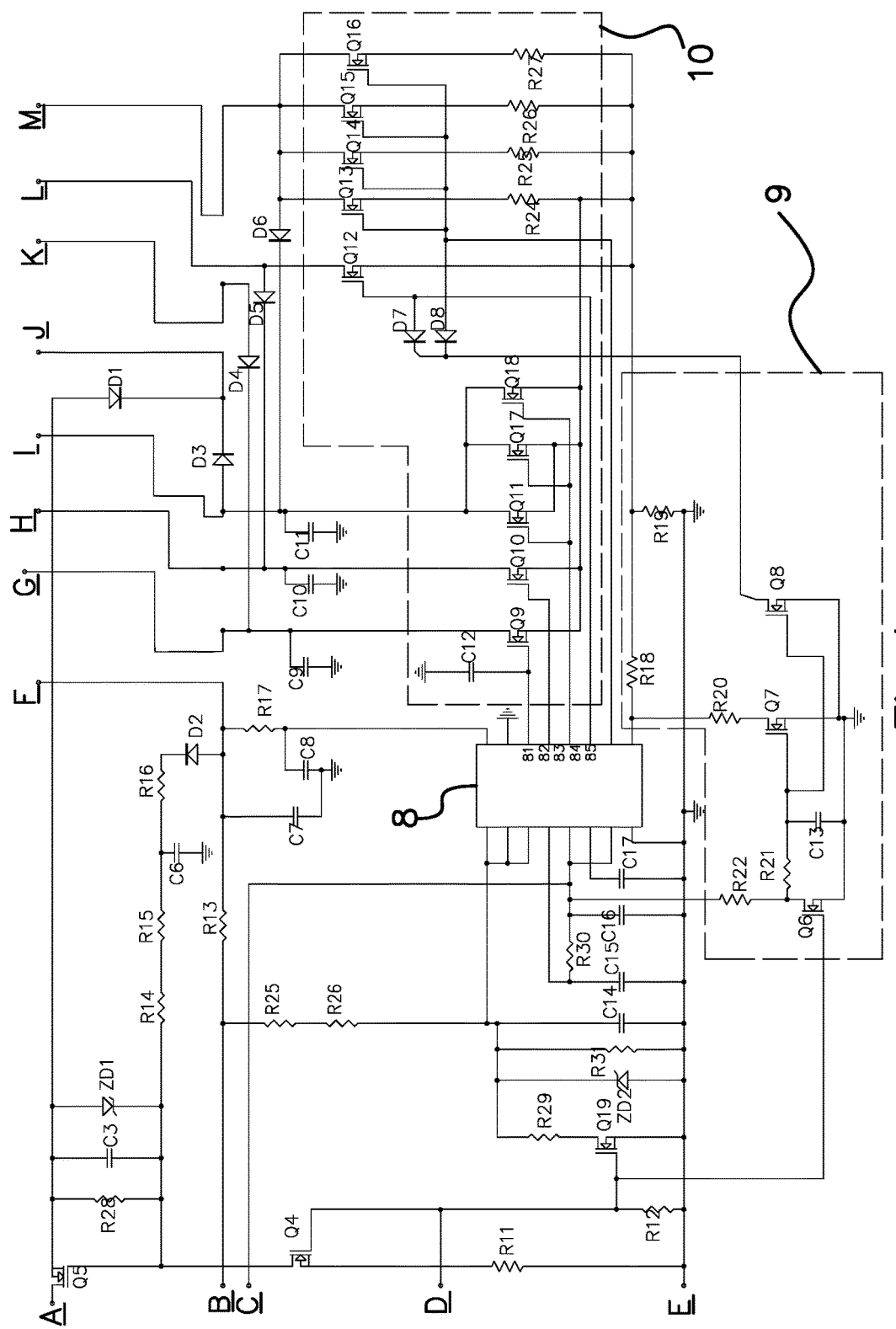
FIG. 4 is a schematic view of a control module of one embodiment of the present invention.
Figure 5:
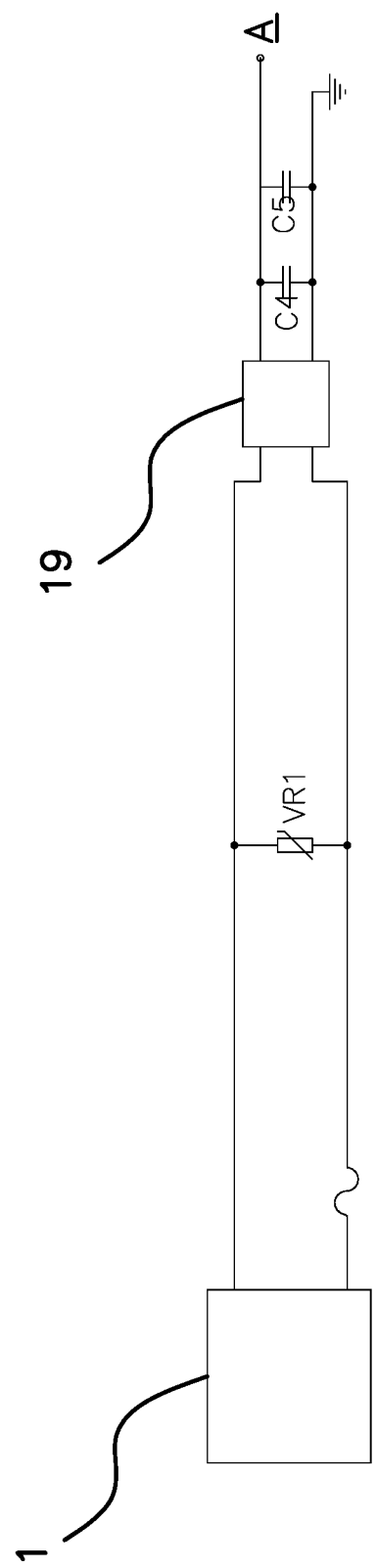
FIG. 5 is a schematic view of a rectifier module of one embodiment of the present invention.

The light actuated module 20 is omitted in FIGS. 2 and 5 of the accompanying drawings. Point A in FIG. 3 and point A in FIG. 4 are respectively connected to point A in FIG. 5. Point B in FIG. 3 is connected to point B in FIG. 4. Point C in FIG. 3 is connected to point C in FIG. 4. Point D in FIG. 3 is connected to point D in FIG. 4. Point E in FIG. 3 is connected to point E in FIG. 4, and point F in FIG. 4 is connected to point F in FIG. 6. Point G in FIG. 4 is connected to Point G in FIG. 6. Point H in FIG. 4 is connected to point H in FIG. 6. Point I in FIG. 4 is connected to point I in FIG. 6. Point J in FIG. 4 is connected to point J in FIG. 6. Point K in FIG. 4 is connected to point K in FIG. 6. Point L in FIG. 4 is connected to point L in FIG. 6. Point M in FIG. 4 is connected to point M in FIG. 6. Thus the circuit diagram in FIG. 2 forms.

Figure 1:
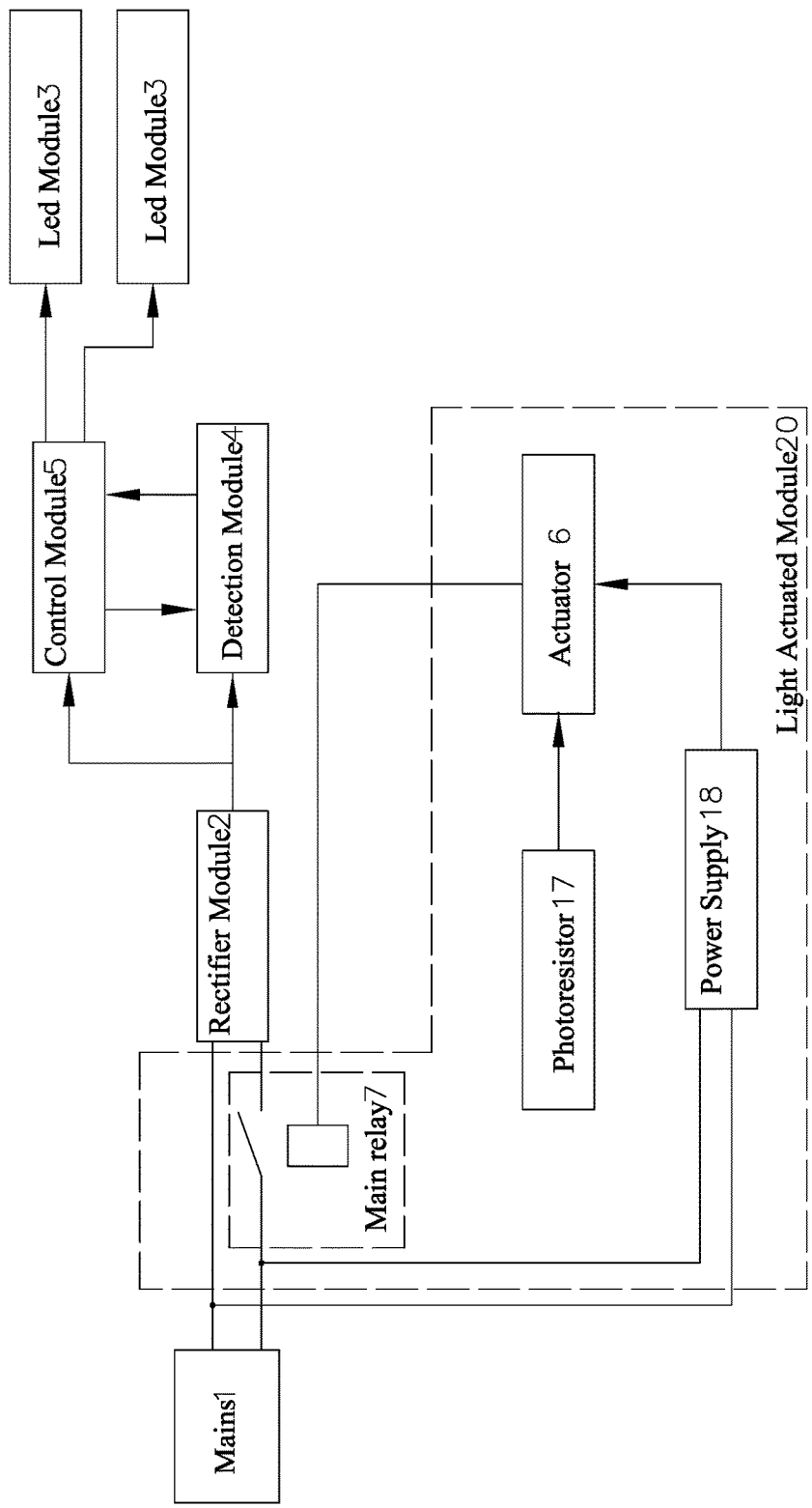
FIG. 1 is a schematic view of modules of one embodiment of the present invention.

As shown in FIG. 1, one embodiment of a light-actuated wide voltage range LED lamp driver circuit includes a rectifier module 2 for connecting to mains 1, two LED modules 3, a detection module 4 for detecting whether the input voltage is in a low voltage range or a high voltage range, and a control module 5 for switching two LED modules 3 in series or parallel and controlling the two LED modules 3 to work at the rated power. The output terminals of the rectifier module 2 are connected to the detection module 4 and the control module 5 respectively, and the detection module 4 and the two LED modules 3 are respectively connected to the control module 5. A voltage set value used for switching the series connection of the two LED modules is set inside the control module 5. The driver circuit further includes a light actuated module 20 with a light sensor. The light actuated module 20 can turn on and off the circuit between mains 1 and the rectifier module 2 according to the brightness of the ambient light. In this embodiment, the light actuated module 20 includes a light sensor, an actuator 6 and a main relay 7. The light sensor is connected to the input terminal of the actuator 6, and the main relay 7 is used to be connected between the mains 1 and the rectifier module 2. The main relay 7 is connected to the output terminal of actuator 6. As another solution: the light actuated module 20 includes an actuator 6 and an electronic switch. The electronic switch is set between the mains 1 and the rectifier module 2. The electronic switch can be a transistor. When the ambient light is low, the actuator 6 controls the electronic switch to conduct the mains 1 and the rectifier module 2. When the ambient light is high, the actuator 6 controls the mains 1 to be disconnected from the rectifier module 2. In this embodiment, the light sensor is a photoresistor 17. Another type of light sensor is a magneto-optic effect sensor. The coil of the main relay 7 is connected to the output terminal of the actuator 6, and the normally-open switch of the main relay 7 is used to be connected between the mains 1 and the rectifier module 2. The power supply 18 can reduce and rectify the voltage to power the actuator 6. This is an existing technology, and it is not necessary to elaborate on that.

As shown in FIGS. 2 and 3, one embodiment of the detection module 4 includes a transistor Q1 and a transistor Q2. The transistor Q1 and the transistor Q2 could be bipolar transistor or field-effect transistor, such as JFET or MOSFET. In this embodiment, the transistor is bipolar transistor. The control module 5 outputs a reference voltage to the transistor Q1 and the transistor Q2. The rectifier module 2 outputs a detection voltage to the transistor Q1 and the transistor Q2. In the low voltage range, the transistor Q1 and the transistor Q2 are both turned off. The detection module 4 outputs a voltage signal lower than the voltage set value to the control module 5. The control module 5 controls the two LED modules 3 to be connected in parallel. In the high voltage range, the transistor Q1 and the transistor Q2 are both turned on. The detection module 4 outputs a voltage signal higher than the voltage set value to the control module 5. The control module 5 controls two LED modules 3 connected in series.

As shown in FIGS. 2 and 3, one embodiment of the detection module 4 further includes a resistor R1, a resistor R2, a resistor R3, a resistor R4, a resistor R5 and a first resistor unit having at least one resistor for voltage division. One end of the first resistor unit is connected to the output terminal of the rectifier module 2. The collector of transistor Q1 is connected to the control module 5 and is connected to the other end of the first resistor unit through the resistor R1. The emitter of transistor Q1 is connected to the control module 5. The base of transistor Q1 is connected to the control module 5 through resistor R2. The collector of transistor Q2 is connected to the base of transistor Q1 through resistor R3. The emitter of the transistor Q2 is connected to the control module 5 through resistor R4. The base of the transistor Q2 is connected to the other end of the first resistor unit. The base of transistor Q2 is also connected to one end of resistor R5. The other end of resistor R5 is grounded. The emitter of transistor Q2 is further connected with a resistor R6, and the other end of resistor R6 is grounded. The first resistor unit includes a resistor R7 and a resistor R8 connected in series. One end of resistor R7 is connected to the output terminal of the rectifier module 2, and the other end is connected to one end of resistor R8. The other end of resistor R8 is respectively connected to the base of transistor Q2 and one end of the resistor R1.

As shown in FIGS. 2 and 3, one embodiment of the detection module 4 further includes a transistor Q3, a resistor R9 and a second resistor unit. The base of transistor Q3 is connected to one end of the second resistor unit and one end of resistor R9. The other end of the second resistor is connected to the output terminal of the rectifier module 2. The other end of resistor R9 is grounded. The emitter of transistor Q3 is connected to the emitter of transistor Q2. The collector of transistor Q3 is connected to the collector of transistor Q2. The total resistance of the second resistor unit is higher than the total resistance of the first resistor unit. The second resistor unit includes a resistor R10 and a resistor R23, and resistor R10 and resistor R23 are connected in series. One end of resistor R10 is connected to the base of transistor Q3, and one end of resistor R23 is connected to the output terminal of the rectifier module 2. The detection module 4 further includes a capacitor C1 and a capacitor C2 for wave filtering and energy storage. One end of capacitor C1 is connected to the base of transistor Q3, and the other end is grounded. One end of capacitor C2 is connected to the base of transistor Q2, and the other end is grounded.

As another solution: one embodiment of the detection module 4 includes a comparator. One of the input terminals of the comparator is connected to the output terminal of the rectifier module 2 through a voltage dividing resistor. The other input terminal is connected to the control module 4 through a voltage dividing resistor. The control module 4 provides a reference voltage. When the comparator is connected to input terminal of the rectifier module 2 and the input voltage is higher than the reference voltage provided by the control module 4, it indicates that the input of the mains 1 is in a high voltage range. At this point, the comparator outputs voltage signal to the control module 4. The control module 4 controls two LED modules 3 to be connected in series. Conversely, the comparator does not output a voltage signal to the control module 4, and the control module 4 controls the two LED modules 3 to be connected in parallel.

As shown in FIGS. 2 and 4, one embodiment of the control module 5 includes a MOS transistor Q4, a MOS transistor Q5, and a resistor R13. In the low voltage range, the detection module 4 outputs a voltage signal lower than the voltage set value to MOS transistor Q4, MOS transistor Q4 is turned off, and MOS transistor Q5 is turned on. In the high voltage range, the detection module 4 outputs a voltage signal higher than the voltage set value to MOS transistor Q4, MOS transistor Q4 is turned on, and MOS transistor Q5 is turned off. The drain of MOS transistor Q4 is connected to the gate of MOS transistor Q5. The source of MOS transistor Q4 is connected with the resistor R11. The other end of resistor R11 is grounded. The gate of the MOS transistor Q4 is respectively connected to resistor R1 and the collector of transistor Q1. The gate of MOS transistor Q4 is further connected with a resistor R12. The other end of resistor R12 is grounded. The drain of MOS transistor Q5 is connected to the output terminal of the rectifier module 2. The source of MOS transistor Q5 is connected with a diode D1. The anode of diode D1 is connected to MOS transistor Q5, and the cathode is connected to the input terminal of one of the two LED modules 3. The input terminal of the other LED module 3 is connected to the output terminal of the rectifier module 2 through a resistor R13 and the output terminal of the LED module 3 is connected to the cathode of diode D1. The gate of the MOS transistor Q5 is connected with the third resistor unit, and the third resistor unit is connected to the output terminal of the rectifier module 2. The third resistor unit includes a resistor R14, a resistor R15 and a resistor R16. The voltage set value is the minimum value where MOS transistor Q4 conducts. One end of resistor R14 is connected to the gate of MOS transistor Q5, and the other end is connected to one end of resistor R15. The other end of resistor R15 is connected to one end of resistor R16, and the other end of resistor R16 is connected with a diode D2. The anode of diode D2 is connected to resistor R13, and the cathode is connected to resistor R16. A capacitor C6 is also connected between resistor R15 and resistor R16. The control module 5 further includes a voltage stabilizer, and the voltage stabilizer includes a Zener diode ZD1, a resistor R28 and a capacitor C3. The two ends of both resistor R28 and capacitor C3 are respectively connected to the source of MOS transistor Q5 and one end of resistor R14. The anode of the Zener diode ZD1 is connected to the source of MOS transistor Q5, and the cathode of the Zener diode ZD1 is connected to one end of resistor R14.

As shown in FIGS. 2 and 4, one embodiment of the control module 5 includes a control chip 8 used for adjusting the operating power of the LED module 3. The control chip 8 adopts the chip of model L1050. The detection input terminal of the control chip 8 is connected with a sampler 9, and the control output terminal of the control chip 8 is connected with a power regulator 10. The output terminals of the two LED modules 3 are respectively connected to the input terminals of the power regulator 10. The output terminal of the power regulator 10 is connected to sampler 9. The power supply terminal of the control chip 8 is connected with a resistor R17, and resistor R17 is connected to the output terminal of the rectifier module 2. The power output terminal of the control chip 8 is respectively connected with the emitter of transistor Q1, the emitter of transistor Q2 and the emitter of transistor Q3. It is connected to the base of transistor Q1 through resistor R2, and is connected respectively to the collector of transistor Q2 and the collector of transistor Q3 through resistor R2 and resistor R3. The control chip 8 makes decision according to the voltage signal sent by the sampler 9, and controls the power regulator 10 to adjust the operating power of the LED module 3. The control chip 8 has five control output terminals, respectively named the first control output terminal 81, the second control output terminal 82, the third control output terminal 83, the fourth control output terminal 84, the fifth control output terminal 85. Two ends of resistor R17 are respectively connected with capacitor C7 and a capacitor C8. The other ends of both capacitor C7 and capacitor C8 are grounded. Capacitor C7 and capacitor C8 are used for wave filtering. The resistor R17 and the rectifier module 2 are connected through resistor R13. The two ends of resistor R13 are respectively connected with resistor R17 and the output terminal of the rectifier module 2. The power output terminal of the control chip 8 is connected with a resistor R30 for stabilizing the voltage output by the control chip 8, a capacitor C15 and a capacitor C16. One end of resistor R30 is connected to the control chip 8, and the other end is connected to one end of capacitor C15. The other end of capacitor C15 is grounded. One end of the capacitor C16 is connected to the control chip 8, and the other end is grounded. The control chip 8 is further connected with a capacitor C17, and the other end of capacitor C17 is grounded.

As another solution: one embodiment of the control module 5 includes a microprocessor, a power regulator 10, a sampler 9, a first main relay, and a second main relay. Two LED modules 3 are connected to the power regulator 10, and the sampler 9 is connected to the power regulator 10. The sampler 9 is connected to the microprocessor, and the power regulator 10 is connected to the output terminal of the microprocessor. The normally-closed switch of the first main relay is arranged between one set of the LED module 3 and the output terminal of the rectifier module 2. The normally-closed switch of the second main relay is arranged between the current input terminal of that set of LED module 3 and the current output terminal of the other set of the LED module 3. The coil of the first main relay and the coil of the second main relay are respectively connected to the output terminal of the microprocessor. In the high voltage range of mains, the microprocessor controls the normally-closed switch of the first main relay to be open, and the normally-closed switch of the second main relay to be closed. Thus the two LED modules 3 are connected in series. In the low voltage range of the mains, the microprocessor controls the normally-closed switch of the first main relay to be closed, and the normally-closed switch of the second main relay to be open. Thus two LED modules 3 are connected in parallel.

As shown in FIGS. 2 and 4, one embodiment of the sampler 9 includes a resistor R18, a resistor R19, a resistor R20, a MOS transistor Q6 and a. In the low voltage range, MOS transistor Q6 is turned off, and MOS transistor Q7 is turned on to connect the resistor R18 and the resistor R20 in series. The detection input terminal of the control chip 8 samples the voltage on resistor R18. In the high voltage range, MOS transistor Q6 is turned on, MOS transistor Q7 is turned off, and the detection input terminal of the control chip 8 samples the voltage on resistor R19. The sampler 9 further includes a MOS transistor Q8 and a capacitor C13. One end of resistor R18 is respectively connected to the detection input terminal of the control chip 8 and one end of resistor R20. The other end is respectively connected to one end of the resistor R19 and the power regulator. The other end of resistor R19 is grounded, and the other end of resistor R20 is connected to the drain of MOS transistor Q7. The source of MOS transistor Q7 is grounded, and the gate of MOS transistor Q7 is connected to the power output terminal of the control chip 8. Resistor R21 and resistor R22 are connected between the gate of MOS transistor Q7 and the power output terminal. The drain of MOS transistor Q6 is connected to the power output terminal of the control chip 8 through resistor R22. The gate of MOS transistor Q6 is connected to the gate of MOS transistor Q4. The gate of MOS transistor Q8 is connected to the gate of MOS transistor Q7. The drain of MOS transistor Q8 is connected to the power regulator 10 and the source of MOS transistor Q8, and the source of MOS transistor Q6 is grounded. Both ends of capacitor C13 are respectively connected to the gate of MOS transistor Q7 and the ground.

As another solution: one embodiment of the sampler 9 comprises a current sensor, and the current sensor is connected to the current sampling input terminal of the control chip 8. The control chip 8 determines whether the mains is in the high voltage range or the low voltage range according to the input voltage of the detection module 4. A first current set value at which the two LED modules 3 work at the rated power in the low voltage range, and a second current set value at which the two LED modules 3 work at the rated power in the high voltage range, are set inside the control chip 8. In the low voltage range, the control chip 8 compares the current sent by the current sensor with the first current set value, and when the two values are different, adjusts the power regulator to change the current in the circuit until they are the same. In the high voltage range, the control chip 8 compares the current sent by the current sensor with the second current set value, and when the two values are different, adjusts the power regulator 10 to change the current in the circuit until they match. Hence, when connected in series and in parallel, the two LED modules 3 can work at rated power.

As shown in FIGS. 2 and 4, one embodiment of the power regulator 10 includes two sets of MOS transistors, and each set of MOS transistors at least includes one MOS transistor. Each LED module 3 includes at least one LED unit, and one LED unit includes at least one LED lamp. The output terminals of the two LED modules are both connected to one set of the MOS transistors, and the other set of MOS transistors is connected to one set of the LED modules 3.

Figure 6:
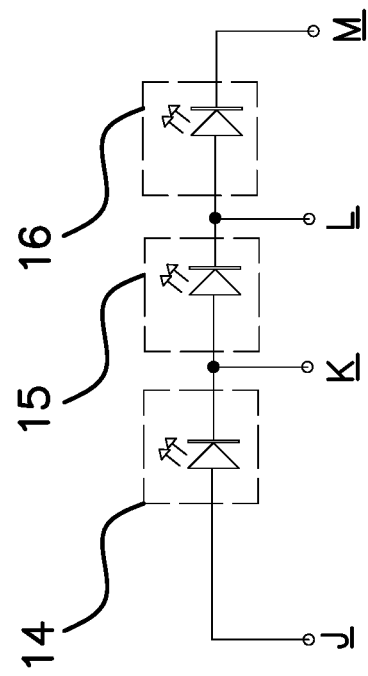
FIG. 6 is a schematic view of two LED modules of one embodiment of the present invention.
Figure 6:
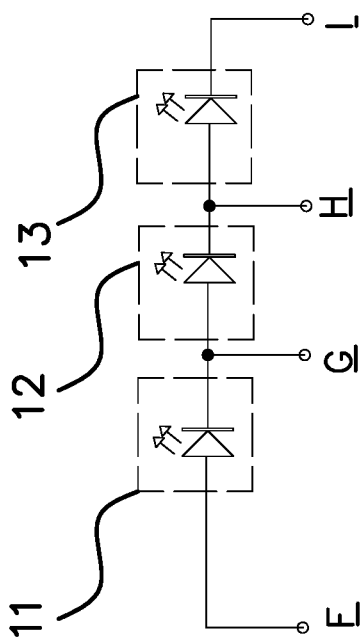

As shown in FIGS. 2 and 6, as a preference, each LED module 3 has three LED units, named first LED unit 11, second LED unit 12, third LED unit 13, fourth LED unit 14, fifth LED unit 15, and sixth LED unit 16 respectively.

Three LED units from each set are connected in series successively. One group of MOS transistors has three MOS transistors, named MOS transistor Q9, MOS transistor Q10, and MOS transistor Q11 respectively. The other group of MOS transistors has two MOS transistors, named MOS transistor Q12 and MOS transistor Q13 respectively. The drain of MOS transistor Q9 is connected to the current output terminals of the first LED unit 11 and the fourth LED unit 14 respectively. The drain of MOS transistor Q10 is connected to the current output terminals of the second LED unit 12 and the fifth LED unit 15 respectively, and the drain of MOS transistor Q11 is respectively connected with the current output terminals of the third LED unit 13 and the sixth LED unit 16. The drain of MOS transistor Q12 is connected to the current output terminal of the fifth LED unit 15, and the drain of MOS transistor Q13 is connected to the current output terminal of the sixth LED unit 16. The gate of MOS transistor Q9, the gate of MOS transistor Q10, the gate of MOS transistor Q11, the gate of MOS transistor Q12 and the gate of MOS transistor Q13 are respectively connected to the control output terminals of the control chip 8. The source of MOS transistor Q9, the source of MOS transistor Q10, the source of MOS transistor Q11, the source of MOS transistor Q12, and the source of MOS transistor Q13 are respectively connected to resistor R19.

The working voltage of the first LED unit 11 is the same as the working voltage of the fourth LED unit 14, the working voltage of the second LED unit 12 is the same as the working voltage of the fifth LED unit 15, and the working voltage of the third LED unit 13 is the same as the working voltage of the sixth LED unit 16.

As shown in FIGS. 2 and 4, one embodiment of the power regulator 10 further includes a MOS transistor Q14, a MOS transistor Q15, a MOS transistor Q16, a MOS transistor Q17, a MOS transistor Q18, a capacitor C12, a resistor R24, a resistor R25, a resistor R26 and a resistor R27. The source of MOS transistor Q13 is connected to one end of resistor R24, and the other end of resistor R24 is connected to one end of resistor R19. The gate of MOS transistor Q14, the gate of MOS transistor Q15 and the gate of MOS transistor Q16 are both connected to the gate of MOS transistor Q13. The gate of MOS transistor Q13 is connected to the fifth control output terminal 85 of the control chip 8. The drain of MOS transistor Q14, the drain of MOS transistor Q15 and the drain of MOS transistor Q16 are all connected to the drain of MOS transistor Q13. The source of MOS transistor Q14 is connected to one end of resistor R25, and one end of resistor R25 is connected to one end of resistor R19. The source of MOS transistor Q15 is connected to one end of resistor R26, and one end of resistor R26 is connected to one end of resistor R19. The source of MOS transistor Q16 is connected to one end of resistor R27, and one end of resistor R27 is connected to one end of resistor R19.

The gate of MOS transistor Q17 and the gate of MOS transistor Q18 are both connected to the gate of MOS transistor Q11. The drain of MOS transistor Q17 and the drain of MOS transistor Q18 are both connected to the drain of MOS transistor Q11. The source of MOS transistor Q17 and the source of MOS transistor Q18 are connected to one end of resistor R19. The gate of MOS transistor Q9 is connected to the first control output terminal 81 of the control chip 8, the gate of MOS transistor Q10 is connected to the second control output terminal 82 of the control chip 8, and the gate of MOS transistor Q11 is connected to the third control output terminal 83 of the control chip 8. The gate of MOS transistor Q12 is connected to the fourth control output terminal 84 of the control chip 8. The capacitor C12, with its one end connected to the gate of MOS transistor Q9, and with its other end grounded is for wave filtering. By adding MOS transistor Q14, MOS transistor Q15, MOS transistor Q16, MOS transistor Q17 and MOS transistor Q18, the efficiency of power regulation is improved, and after the LED units of the two LED modules 3 are connected in series, at the last current output terminal, there are a plurality of MOS transistors for the power regulation, further improving the cooling and power regulation effects. As another solution: the power regulator 10 includes two sets of MOS transistors, and each set of MOS transistors has at least one MOS transistor, named the first MOS transistor and the second MOS transistor respectively. The current output terminal of the third LED unit 13 is connected to the drain of the first MOS transistor, the gate of the first MOS transistor is connected to the control chip 8, and the source of the first MOS transistor is connected to resistor R19. The current output terminal of the sixth LED unit 16 is connected to the drain of the second MOS transistor, the gate of the second MOS transistor is connected to the control chip 8, and the source of the second MOS transistor is connected to resistor R19.

As shown in FIGS. 2 and 4, one embodiment of the control module 5 further includes a capacitor C9, a capacitor C10, a capacitor C11 for wave filtering, and a diode D3, a diode D4, a diode D5 and a diode D6 for preventing reverse current flow. The anode of diode D3 is connected to the output terminal of the third LED unit 13, and the cathode of diode D3 is connected to the input terminal of the fourth LED unit 14. The anode of diode D4 is connected to the output terminal of the fourth LED unit 14, and the cathode of diode D4 is connected to the output terminal of the first LED unit 11. The anode of diode D5 is connected to the output terminal of the fifth LED unit 15, and the cathode of diode D5 is connected to the output terminal of the second LED unit 12. The anode of diode module D6 is connected to the output terminal of the sixth LED unit 16, and the cathode of diode D5 is connected to the output terminal of the third LED unit 13. One end of capacitor C9, one end of capacitor C10 and one end of capacitor C11 are grounded. The other end of capacitor C9 is connected to the cathode of diode D4, the other end of capacitor C10 is connected to the cathode of diode D5, and the other end of capacitor C11 is connected to the cathode of diode D6. As shown in FIGS. 2 and 4, the control module 5 also includes an input voltage detection unit for adjusting the power factor and harmonics of the mains 1. The input voltage detection unit includes a MOS transistor Q19, a resistor R29, a Zener diode ZD2, a resistor R31, a resistor R25, a resistor R26, and a capacitor C14. One end of resistor R25 is connected to the output terminal of the rectifier module 2, and the other end is connected to one end of resistor R26. The other end of resistor R26 is connected to the voltage detection terminal of mains 1 of the control chip 8. One end of resistor R29, the cathode of Zener diode ZD2, one end of resistor R31, and one end of capacitor C14 are respectively connected to the voltage detection terminal of the mains 1 of the control chip 8. The other end of resistor R29 is connected to the drain of MOS transistor Q19, the gate of MOS transistor Q19 is connected to the gate of MOS transistor Q4, and the source of MOS transistor Q19 is grounded. The anode of the Zener diode ZD2 is grounded, and the other end of resistor R31 and the other end of capacitor C14 are grounded. Through the above arrangement, it is ensured that the voltage input to the mains voltage detection terminal of the control chip 8 will not breakdown the control chip 8, and can adjust the mains 1 power factor and harmonics.

As shown in FIG. 5, one embodiment of the rectifier module 2 includes a varistor VR1 and a full bridge rectifier 19 for preventing current surges, and a capacitor C4 and a capacitor C5 for wave filtering. The varistor VR1 is connected in parallel between the mains 1 and the full bridge rectifier 19. The circuit of the full bridge rectifier 19 can convert an AC voltage into a DC voltage. This is an existing technology, and it is not necessary to elaborate on that. Capacitor C4 and capacitor C5 are respectively connected in parallel with the full bridge rectifier 19. The output terminals of the full bridge rectifier 19 are respectively connected with resistor R7, resistor R23, resistor R13, MOS transistor Q5 and resistor R25, so as to power the detection module 4 and the control module 5, as well as the two LED modules 3. As another solution, the rectifier module 2 includes a rectifier, and rectifies the mains through the rectifier.

The following is the working process of one embodiment of the present invention:

One embodiment of the light-actuated wide voltage range LED lamp driver circuit senses the brightness of the ambient light through a photoresistor 17. Depending on different brightness of ambient light, the resistance of photoresistor 17 also changes, so that the signal input to the actuator 6 is different. The actuator 6 controls the normally-open switch of the main relay 7 to be closed when the input signal is lower than the set value of light brightness set inside the actuator 6. Thus, the rectifier module 2 and the mains 1 are turned on, powered and start to work. The driver circuit starts to drive the two LED modules 3 to work.

One embodiment of the detection module 4 detects whether the mains is in the high voltage range or the low voltage range. It is determined that the low voltage range is when the input voltage of mains 1 is higher than 90V and less than 160V, and high voltage range when it is higher than 160V and less than 305V. When the mains 1 and the rectifier module 2 are turned on, the rectifier module 2 rectifies the mains 1 and then outputs the voltage to the detection module 4 and the control module 5.

The rectified output voltage of one embodiment of the rectifier module 2, after being divided by resistor R13 and resistor R17, and is then output to the power supply terminal of the control chip 8 to supply the power, making the control chip start to work. The power output terminal of the control chip 8 outputs a reference voltage to the emitter of transistor Q1, the emitter of transistor Q2 and the emitter of transistor Q3. At the same time, the rectified output voltage of the rectifier module 2, after being divided by resistor R7, resistor R8 and resistor R1, and is then sent to the collector of transistor Q1. The rectified output voltage of the rectifier module 2 is divided by resistor R7 and resistor R8 resistor, and then sent to the base of transistor Q2. The rectified output voltage of the rectifier module 2 is divided by resistor R10 and resistor R23, and then sent to the base of transistor Q3. The collector of transistor Q2 and the collector of transistor Q3 also receive the reference voltage output by the control chip 8.

When one embodiment of mains 1 input is in the low voltage range, there is no voltage high enough input to the base of transistor Q2 and the base of transistor Q3, so that transistor Q2 and transistor Q3 are not biased. When transistor Q2 is not biased and thus turned off, transistor Q1 is also not biased. Thus, transistor Q1 is turned off. Therefore, the voltage at the gate of the MOS transistor Q4 after being divided by resistor R7, resistor R8 and resistor R1 is lower than the starting voltage of MOS transistor Q4. The starting voltage of MOS transistor Q4 is the lowest value at which MOS transistor Q4 is turned on, namely, the voltage set value. When MOS transistor Q4 is turned off, the rectified voltage of the rectifier module 2 flows to the gate of MOS transistor Q5, reaches the starting voltage of MOS transistor Q5, and at this point, MOS transistor Q5 is turned on. After MOS transistor Q5 is turned on, the rectified current of the rectifier module 2 flows into the first LED unit 11 through resistor R13, and sequentially flows through the second LED unit 12 and the third LED unit 13. At the same time, the rectified current of the rectifier module 2 flows into the fourth LED unit 14 through diode D1, and then sequentially flows into the fifth LED unit 15 and the sixth LED unit 16, so that two LED modules 3 are connected in parallel, and a sufficient working voltage can be provided for the LED module 3 to operate in a low voltage range.

When one embodiment of mains 1 input is in the high voltage range and less than 200V, since the total resistance of the second resistor unit is greater than the total resistance of the first resistor unit, at this time there is no high enough voltage input to the base of transistor Q3. However, the conduction condition of transistor Q2 is met, transistor Q3 is turned off, and transistor Q2 is turned on. When the mains 1 is higher than 200V, transistor Q2 remains on, and transistor Q3 also remains on. When it is higher than 220V, transistor Q2 is off, and transistor Q3 remains on. Through the above arrangement, the scope covered by the present driver circuit is enlarged, and thus it is more practical. Transistor Q3 and transistor Q2 are both turned on for a period of time. This prevents transistor Q3 and transistor Q2 from being turned off simultaneously when a high voltage is input.

When at least one of transistor Q2 and transistor Q3 is turned on, transistor Q1 is also turned on. Thus the gate of MOS transistor Q4 not only receives the voltage first rectified by the rectifier module 2, and then voltage-divided but also receives the reference voltage output by the control chip 8 after the transistor Q1 is turned on. Therefore, the voltage received is higher than the starting voltage of MOS transistor Q4, and MOS transistor Q4 is turned on. The conducted MOS transistor Q4 pulls down the gate voltage of MOS transistor Q5, so that the MOS transistor Q5 is turned off. Therefore, after the rectified current of the rectifier module 2 passes through resistor R13, it flows from the first LED unit 11 till the sixth LED unit 16 sequentially. Two LED modules 3 are connected in series.

Since the connection modes of the two LED modules in the low voltage range and in the high voltage range are different, in order to ensure that the total power of the two LED modules is the rated power in the two different connection modes. It is needed to increase the LED module 3 working current when connected in parallel.

In the low voltage range, MOS transistor Q6 is turned off, and MOS transistor Q7 and MOS transistor Q8 are turned on. The conducted MOS transistor Q8 pulls down the gate voltage of MOS transistor Q12, MOS transistor Q13, MOS transistor Q14, MOS transistor Q15, and MOS transistor Q16, so they are turned off. MOS transistor Q9, MOS transistor Q10, MOS transistor Q11, MOS transistor Q17 and MOS transistor Q18 are turned on, so that the control chip 8 adjusts the operating power of the two LED modules 3 through MOS transistor Q9, MOS transistor Q10, MOS transistor Q11, MOS transistor Q17 and MOS transistor Q18 in the low voltage range. The control chip 8 sets the sampling voltage set value corresponding to the total rated power of the two LED modules 3. Since MOS transistor Q7 is turned on in the low voltage range, the voltage collected by the control chip 8 is the voltage applied to resistor R18. Based on the sampled voltage, the control chip 8 outputs different duty cycle signals to control MOS transistor Q9, MOS transistor Q10, MOS transistor Q11, MOS transistor Q17, and MOS transistor Q18 to operate according to the corresponding duty ratio, until the voltage sampled by the control chip 8 is equal to the sampling voltage set value. When the sampled voltage is equal to the sampling voltage set value, the control chip 8 controls MOS transistor Q9, MOS transistor Q10, MOS transistor Q11, MOS transistor Q17 and MOS transistor Q18 to operate according to the current duty ratio.

In the high voltage range, MOS transistor Q6 is turned on, MOS transistor Q7 and MOS transistor Q8 are turned off, and MOS transistor Q9 through MOS transistor Q18 are all turned on, so that the control chip 8 adjusts the operating power of the two LED modules 3 through MOS transistor Q9 through MOS transistor Q18 in the high voltage range. Therefore, in the high voltage range, the voltage collected by the control chip 8 is voltage applied to resistor R19. Based on the sampled voltage, the control chip 8 outputs different duty cycle signals to control MOS transistor Q9 through MOS transistor Q18 to operate according to the corresponding duty ratio, until the voltage sampled by the control chip 8 is equal to the sampling voltage set value. When the sampled voltage is equal to the sampling voltage set value, the control chip 8 controls MOS transistor Q9 through MOS transistor Q18 to operate according to the current duty ratio. Since the resistors sampled by the control chip 8 are different when the two LED modules 3 are connected in series and in parallel, when connected in parallel, the voltage across resistor R19 is twice the voltage across the resistor R18. Since the operating voltage of the first LED unit 11 is the same as the operating voltage of the fourth LED unit 14, the operating voltage of the second LED unit 12 is the same as the operating voltage of the fifth LED unit 15, and the operating voltage of the third LED unit three 13 is the same as the operating voltage of the sixth LED unit 16, when the same sampling voltage set value is reached, the current in the parallel mode is twice of that in the series mode. Thus, the two LED modules 3 can reach the same rated power through the present drive circuit when connected in series and in parallel.

By providing the detection module 4, one embodiment of the present light-actuated wide voltage range LED lamp driver circuit can output different voltage signals to the control module 5 according to different input voltage ranges. The control module 5 can control the two LED modules 3 to be connected in series or in parallel to maximize the utilization of the current input voltage. At the same time, this ensures that the two LED modules 3 work at rated power, so that the driver circuit can adapt to a wide range of mains 1 voltage. By setting the driver circuit, LED lamp products can be "plug and play" in most countries.

The description of the preferred embodiments thereof serves only as an illustration of the spirit of the invention. It will be understood by those skilled in the art that various changes or supplements in form and details may be made therein without departing from the spirit and scope of the invention as defined by the appended claims.

Although terms of mains 1, rectifier module 2, LED module 3, detection module 4, control module 5, actuator 6, main relay 7, control chip 8, sampler 9, power regulator 10, first LED Unit 11, second LED unit 12, third LED unit 13, fourth LED unit 14, fifth LED unit 15, sixth LED unit 16, photoresistor 17, power supply 18, full bridge rectifier 19, light actuated module 20 and etc. are greatly used herein, it does not exclude the possibility to use any other terms. Using such terms is only to describe or explain the nature of the present invention more conveniently. To interpret them as any additional restrictions is contrary to the spirit of the present invention.

LIST OF REFERENCE NUMERALS

1. Mains
2. Rectifier Module
3. Led Module
4. Detection Module
5. Control Module
6. Actuator
7 Main relay
8 Control Chip
9. Sampler
10. Power Regulator
11. First Led Unit
12. Second Led Unit
13. Third Led Unit
14. Fourth Led Unit
15. Fifth Led Unit
16. Sixth Led Unit
17. Photoresistor
18. Power Supply
19. Full Bridge Rectifier
20. Light Actuated Module

What is claimed is:

1. A light-actuated wide voltage range LED lamp driver circuit, comprising:
   a rectifier module connecting mains and two LED modules, the two LED modules consisting of a first LED module and a second LED module;
   a detection module capable of detecting whether an input voltage is in a low voltage range or in a high voltage range;
   a module configured to switch two LED modules in series or in parallel, the module capable of controlling the two LED modules to work at a rated power;
   output terminals of the rectifier module connected to the detection module and the module;
   a voltage set value of the module, the voltage set value configured to switch the two LED lamps into series connection;
   a first transistor of the detection module; and
   a second transistor of the detection module;
   wherein the detection module and the two LED modules connected to the module;
   wherein the module outputs a reference voltage to the first transistor and the second transistor;
   wherein the rectifier module outputs a detection voltage to the first transistor and the second transistor;
   wherein at the low voltage range, both the first transistor and the second transistor are turned off, making the two LED modules connected in parallel; and
   wherein at the high voltage range, both the first transistor and the second transistor are turned on, making the two LED modules connected in series.

2. The light-actuated wide voltage range LED lamp driver circuit as claimed in claim 1, further comprising:
   a first resistor of the detection module;
   a second resistor of the detection module;
   a third resistor of the detection module;
   a fourth resistor of the detection module;
   a fifth resistor of the detection module;
   a first resistor unit of the detection module, the first resistor unit having at least one resistor;
   a first end of the first resistor unit connected to the output terminal of the rectifier module;
   a second end of the first resistor unit;
   a collector of the first transistor connected to the module and connected to the second end of the first resistor unit through the first resistor;
   an emitter of the first transistor connected to module;
   a base of the first transistor connected to the module through the second resistor;
   a collector of the second transistor connected to the base of the first transistor through the third resistor;
   an emitter of the second transistor connected to the module through the fourth resistor;
   a base of the second transistor connected to the second end of the first resistor unit and connected to a first end of the fifth resistor;
   a second end of the fifth resistor, the second end of the fifth resistor being grounded;
   a sixth resistor having a first end and a second end, the first end of the sixth resistor connected with the emitter of the second transistor, and the second end of the sixth resistor being grounded;
   a third transistor of the detection module;
   a ninth resistor of the detection module;
   a second resistor unit of the detection module;
   a base of the third transistor connected to a first end of the second resistor unit and connected to a first end of the ninth resistor;
   a second end of the second resistor unit connected to an output terminal of the rectifier module;
   a second end of the ninth resistor, the second end of the ninth resistor being grounded;
   an emitter of the third transistor connected to the emitter of the second transistor; and
   a collector of the third transistor connected to the collector of the second transistor;
   wherein a total resistance of the second resistor unit is higher than a total resistance of the first resistor unit.

3. The light-actuated wide voltage range LED lamp driver circuit as claimed in claim 2, further comprising:
 a fourth MOS transistor of the module;
 a fifth MOS transistor of the module;
 a thirteenth resistor of the module;
 a drain of the fourth MOS transistor connected to a gate of the fifth MOS transistor;
 a source of the fourth MOS transistor connected with a first end of the eleventh resistor;
 a second end of the eleventh resistor, the second end of the eleventh resistor being grounded;
 a gate of the fourth MOS transistor is connected to the first resistor and to the collector of the first transistor, the gate of the fourth MOS transistor is further connected with a first end of the twelveth resistor;
 a second end of the twelveth resistor is grounded;
 a drain of the fifth MOS transistor connected to an output terminal of the rectifier module;
 a source of the fifth MOS transistor connected with a first diode;
 an anode of the first diode connected to the fifth MOS transistor;
 an cathode of the first diode connected to an input terminal of a first LED module;
 an input terminal of a second LED module connected to an output terminal of the rectifier module through the thirteenth resistor;
 an output terminal of the LED module 3 connected to the cathode of the first diode; and
 a gate of the fifth MOS transistor connected with a third resistor unit, the third resistor unit connected to the output terminal of the rectifier module;
 wherein at the low voltage range, the detection module outputs a voltage signal lower than a voltage set value to the fourth MOS transistor, switching the fourth MOS transistor off and the fifth MOS transistor on; and
 wherein at the high voltage range, the detection module outputs a voltage signal higher than a voltage set value to the fourth MOS transistor, switching the fourth MOS transistor on and the fifth MOS transistor off.

4. The light-actuated wide voltage range LED lamp driver circuit as claimed in claim 2, further comprising:
 a control chip of the module configured to adjust an operating power of the LED module 3;
 a detection input terminal of the control chip connected with a sampler;
 control output terminals of the control chip connected with a power regulator;
 output terminals of the two LED modules connected to input terminals of the power regulator;
 an output terminal of the power regulator connected to the sampler;
 a power supply terminal of the control chip connected with a seventeenth resistor, the seventeenth resistor being connected to the output terminal of the rectifier module; and
 power output terminals of the control chip connected to the emitter of the first transistor, the emitter of the second transistor, and the emitter of the third transistor;
 wherein the control chip makes decisions according to a voltage signal sent by the sampler; and
 wherein the control chip controls the power regulator to adjust an operating power of the LED module 3.

5. The light-actuated wide voltage range LED lamp driver circuit as claimed in claim 4, further comprising:
 an eighteenth resistor of the sampler;
 a nineteenth resistor of the sampler;
 a twentieth resistor of the sampler;
 a sixth MOS transistor of the sampler; and
 a seventh MOS transistor of the sampler;
 wherein at the low voltage range, the sixth MOS transistor is turned off, the seventh MOS transistor is turned on to connect the eighteenth resistor and the twentieth resistor in series, and the detection input terminal of the control chip samples the voltage on the eighteenth resistor; and
 wherein at the high voltage range, the sixth MOS transistor is turned on, the seventh MOS transistor is turned off, and the detection input terminal of the control chip samples a voltage on the nineteenth resistor.

6. The light-actuated wide voltage range LED lamp driver circuit as claimed in claim 5, further comprising:
 an eighth MOS transistor of the sampler;
 a first end of the eighteenth resistor connected to the detection input terminal of the control chip and a first end of the twentieth resistor;
 a second end of the eighteenth resistor connected to a first end of the nineteenth resistor and the power regulator;
 a second end of the nineteenth resistor, the second end of the nineteenth resistor being grounded;
 a second end of the twentieth resistor connected to a drain of the seventh MOS transistor;
 a source of the seventh MOS transistor, the source of the seventh MOS transistor being grounded;
 a gate of the seventh MOS transistor connected to the power output terminal of the control chip;
 a twenty-first resistor and a twenty-second resistor connected between the gate of the seventh MOS transistor and the power output terminal;
 a drain of the sixth MOS transistor connected to the power output terminal of the control chip through the twenty-second resistor;
 a gate of the sixth MOS transistor connected to a gate of the fourth MOS transistor;
 a gate of the eighth MOS transistor connected to a gate of the seventh MOS transistor;
 a drain of the eighth MOS transistor connected to the power regulator;
 a source of the sixth MOS transistor, the source of the sixth MOS transistor being grounded; and
 a source of the eighth MOS transistor, the source of the eighth MOS transistor being grounded.

7. The light-actuated wide voltage range LED lamp driver circuit as claimed in claim 4, further comprising:
 two sets of power regulator MOS transistors of the power regulator, each set of power regulator MOS transistors having at least one power regulator MOS transistor;
 wherein each LED module 3 includes at least one LED unit, and one LED unit includes at least one LED lamp;
 wherein output terminals of the two LED modules are both connected to a first set of the MOS transistors; and
 wherein a second set of MOS transistors is connected to one of the LED modules.

8. The light-actuated wide voltage range LED lamp driver circuit as claimed in claim 7, further comprising:
 a first LED unit of the first LED module;
 a second LED unit of the first LED module;
 a third LED unit of the first LED module, the first LED unit, the second LED unit, and the third LED unit connected in series consecutively;
 a fourth LED unit of the second LED module;
 a fifth LED unit of the second LED module;

a sixth LED unit of the second LED module, the fourth LED unit, the fifth LED unit, and the sixth LED unit connected in series consecutively;

a first group of MOS transistors having three MOS transistors, comprising a ninth MOS transistor, a tenth MOS transistor, and an eleventh MOS transistor;

a second group of MOS transistors having two MOS transistors, comprising a twelveth MOS transistor and a thirteenth MOS transistor;

a drain of the ninth MOS transistor connected to a current output terminal of the first LED unit and to a current output terminal of the fourth LED unit;

a drain of the tenth MOS transistor connected to a current output terminal of the second LED unit and to a current output terminal of the fifth LED unit;

a drain of the eleventh MOS transistor connected to a current output terminal of the third LED unit and to a current output terminal of the sixth LED unit;

a drain of the twelveth MOS transistor connected to a current output terminal of the fifth LED unit;

a drain of the thirteenth MOS transistor is connected to a current output terminal of the sixth LED unit;

a gate of the ninth MOS transistor, a gate of the tenth MOS transistor, a gate of the eleventh MOS transistor, a gate of the twelveth MOS transistor, and a gate of the thirteenth MOS transistor connected to control output terminals of the control chip; and a source of the ninth MOS transistor, a source of the tenth MOS transistor, a source of the eleventh MOS transistor, a source of the twelveth MOS transistor, and a source of the thirteenth MOS transistor connected to the nineteenth resistor.

9. The light-actuated wide voltage range LED lamp driver circuit as claimed in claim 1, further comprising:

a light actuated module of the driver circuit, the light actuated module having a light sensor;

wherein the light actuated module is capable of switching on and off the mains and the rectifier module, according to a brightness of ambient light.

10. The light-actuated wide voltage range LED lamp driver circuit as claimed in claim 9, further comprising:

an actuator of the light actuated module;

a main relay of the light actuated module;

an input terminal of the actuator connected to the light sensor; and an output terminal of the actuator connected to the main relay;

wherein the main relay is configured to connect mains and the rectifier module;

wherein the light sensor is a photoresistor;

wherein the photoresistor is connected to the input terminal of the actuator;

wherein a coil of the main relay is connected to the output terminal of the actuator; and wherein a normally-open switch of the main relay is configured to connect mains and the rectifier module.

* * * * *